(12) United States Patent
Dowlatkhah et al.

(10) Patent No.: US 11,282,252 B2
(45) Date of Patent: *Mar. 22, 2022

(54) ALLOCATING AND EXTRAPOLATING DATA FOR AUGMENTED REALITY

(71) Applicants: AT&T Mobility II LLC, Atlanta, GA (US); AT&T Intellectual Property I, L.P., Atlanta, GA (US)

(72) Inventors: Sangar Dowlatkhah, Plano, TX (US); Zhi Cui, Sugar Hill, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,042

(22) Filed: Mar. 1, 2021

(65) Prior Publication Data

US 2021/0209824 A1 Jul. 8, 2021

Related U.S. Application Data

(63) Continuation of application No. 16/364,916, filed on Mar. 26, 2019, now Pat. No. 10,970,902.

(51) Int. Cl.
*G06T 11/60* (2006.01)
*H04W 4/44* (2018.01)
(Continued)

(52) U.S. Cl.
CPC ............... *G06T 11/60* (2013.01); *G06F 3/14* (2013.01); *G06T 11/001* (2013.01); *H04W 4/029* (2018.02); *H04W 4/44* (2018.02)

(58) Field of Classification Search
None
See application file for complete search history.

(56) References Cited

U.S. PATENT DOCUMENTS 6,150,961 A 11/2000 Alewine et al.
6,577,946 B2 6/2003 Myr
(Continued)

FOREIGN PATENT DOCUMENTS

WO 2015110454 A1 7/2015

OTHER PUBLICATIONS

Hu, et al. "Smartroad: Smartphone-based crowd sensing for traffic regulator detection and identification." ACM Transactions on Sensor Networks (TOSN) 11.4(2015): 55. 27 pages, http://citeseerx.ist.psu.ed u/viewdoc/download? doi=1 0.1.1.723.8181 &rep=rep1 &type=pdf.

(Continued)

*Primary Examiner* — Jason A Pringle-Parker
(74) *Attorney, Agent, or Firm* — Amin, Turocy & Watson, LLP

(57) ABSTRACT

Global position system tagging the movement of an object and extrapolating its direction and speed can be used for various services including emergency-based services. Location data can be computed using edge computing nodes. The extrapolation system can account for feedback from responding user devices and utilize the user device's location at the time of reporting to facilitate determining the direction, location, and/or speed of a moving object. This data can then be utilized to generate augmented reality displays for mobile devices and/or vehicles that utilize the system. The ability to calculate directional information with edge computing nodes can comprise an ability to add enriched data by predicting an object's whereabouts, route, and/or final destination.

20 Claims, 10 Drawing Sheets

(51) Int. Cl.
*G06F 3/14* (2006.01)
*G06T 11/00* (2006.01)
*H04W 4/029* (2018.01)

(56) References Cited

U.S. PATENT DOCUMENTS

| | | |
|---|---|---|
| 7,430,471 B2 | 9/2008 | Simon |
| 7,701,363 B1 | 4/2010 | Zlojutro |
| 7,801,512 B1 | 9/2010 | Myr |
| 7,912,628 B2 | 3/2011 | Chapman et al. |
| 7,990,265 B2 | 8/2011 | Fischbach et al. |
| 8,781,169 B2 | 7/2014 | Jackson et al. |
| 8,941,560 B2 | 1/2015 | Wong et al. |
| 9,485,206 B2 | 11/2016 | Day, II et al. |
| 9,552,725 B2 | 1/2017 | Feldman et al. |
| 9,552,734 B2 | 1/2017 | Zlojutro |
| 10,013,531 B2 | 7/2018 | Richards et al. |
| 10,019,621 B2 | 7/2018 | Elswick |
| 10,070,294 B2 | 9/2018 | Waters et al. |
| 10,089,869 B1 | 10/2018 | Makled et al. |
| 10,147,013 B2 | 12/2018 | Miller et al. |
| 2008/0048932 A1 | 2/2008 | Yanagisawa |
| 2008/0068261 A1 | 3/2008 | Hempel |
| 2012/0105475 A1* | 5/2012 | Tseng ............... G01S 19/13 345/633 |
| 2013/0330088 A1* | 12/2013 | Oshima ............ H04N 5/23206 398/130 |
| 2014/0168243 A1 | 6/2014 | Huang |
| 2014/0236483 A1 | 8/2014 | Beaurepaire et al. |
| 2016/0080279 A1 | 3/2016 | Tan et al. |
| 2017/0132922 A1 | 5/2017 | Gupta et al. |
| 2017/0270792 A1 | 9/2017 | Breton |
| 2018/0003965 A1 | 1/2018 | O'Toole et al. |
| 2018/0007552 A1 | 1/2018 | Bae et al. |
| 2018/0172463 A1 | 6/2018 | Morales |
| 2018/0374365 A1 | 12/2018 | Rivera et al. |
| 2019/0113629 A1 | 4/2019 | Kang et al. |

OTHER PUBLICATIONS

Gerla. "Vehicular cloud computing." Ad Hoc Networking Workshop (Med-Hoc-Net), 2012 The 11th Annual Mediterranean, IEEE, 2012. 4 pages. http://nrlweb.cs.ucla.edu/nrlweb/publication/download/779/0 6257116_1_.pdf.

Fujimoto, et al. "A Dynamic Data Driven Application System for Vehicle Tracking." ICCS. 2014. 13 pages. http://citeseerx.ist.psu.edu/viewdoc/download?doi=10.1.1.636.5019&rep=rep1 &type=pdf.

Non-Final Office Action received for U.S. Appl. No. 16/364,916 dated Mar. 4, 2020, 36 pages.

Final Office Action received for U.S. Appl. No. 16/364,916 dated Aug. 3, 2020, 33 pages.

* cited by examiner

ALLOCATING AND EXTRAPOLATING DATA FOR AUGMENTED REALITY

RELATED APPLICATION

The subject patent application is a continuation of, and claims priority to, U.S. patent application Ser. No. 16/364,916 (now U.S. Pat. No. 10,970,902), filed Mar. 26, 2019, and entitled "ALLOCATING AND EXTRAPOLATING DATA FOR AUGMENTED REALITY FOR 6G OR OTHER NEXT GENERATION NETWORK," the entirety of which application is hereby incorporated by reference herein.

TECHNICAL FIELD

This disclosure relates generally to facilitating augmented reality. For example, this disclosure relates to allocating and extrapolating data for augmented reality for a 6G, or other next generation network.

BACKGROUND

Augmented reality (AR) is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (e.g., additive to the natural environment) or destructive (e.g., masking of the natural environment) and is seamlessly interwoven with the physical world such that it is perceived as an immersive aspect of the real environment. In this way, augmented reality alters one's ongoing perception of a real-world environment, whereas virtual reality completely replaces the user's real-world environment with a simulated environment. Augmented reality is related to two largely synonymous terms: mixed reality and computer-mediated reality.

The above-described background relating to augmented reality is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
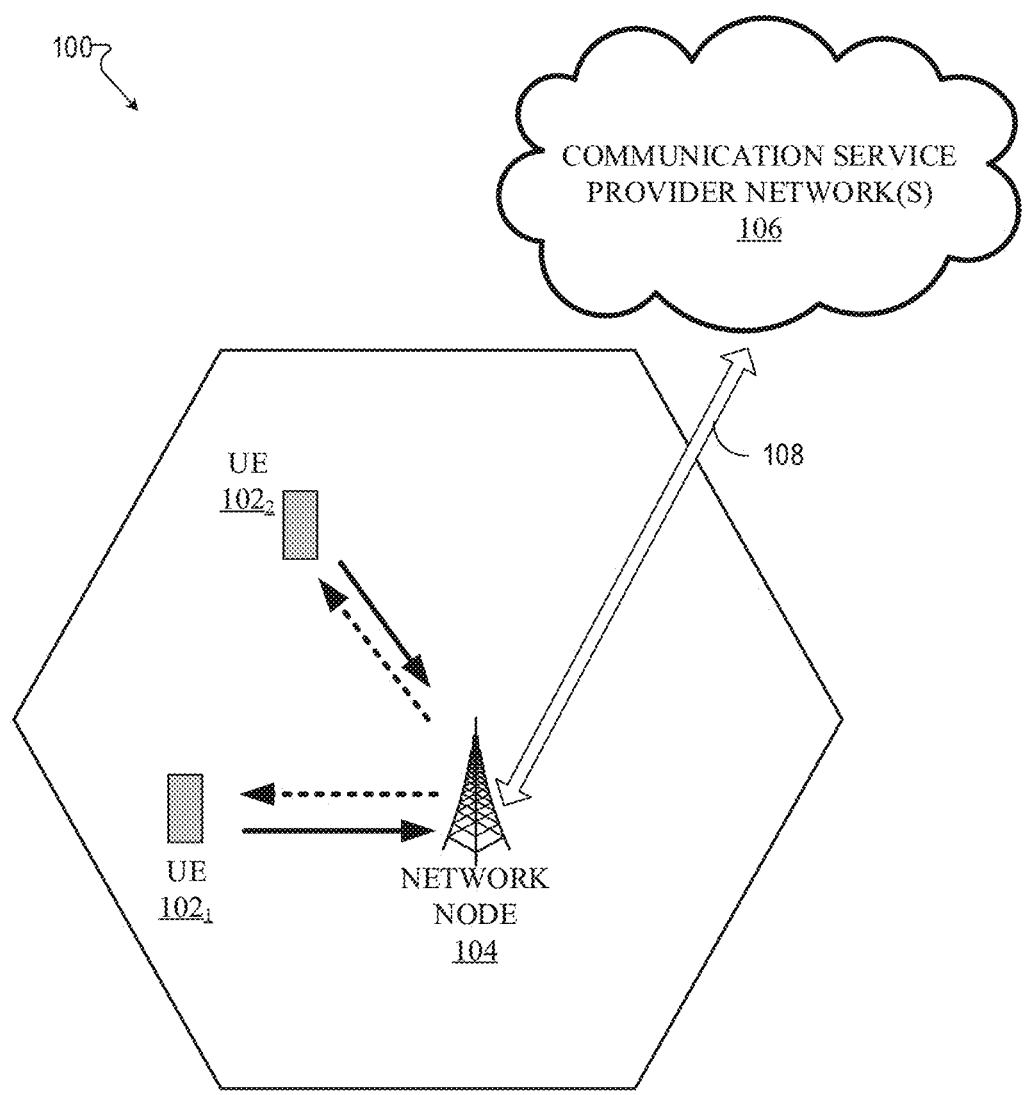
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate augmented reality for a 6G interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 6G, the disclosed aspects are not limited to 6G, a UMTS implementation, and/or an LTE implementation as the techniques can also be applied in 3G, 4G, 5G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate augmented reality for a 6G network. Facilitating augmented reality for a 6G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

An LTE network can be a policy-based traffic management architecture with a PCRF element traditionally controlling the QoS levels and other information (priorities bandwidths, etc.) that manages IP flows that carries a particular application (such as voice, video, messaging, etc.). This policy-based mechanism applies to the IP traffic between the mobile device and the packet data network gateway ("PGW"). In an embodiment of the subject disclosure, software defined networking can be used to provide routing and traffic control for packets sent from the PGW to a destination address. In some embodiments, the SDN controller can also provide traffic control for packets from the mobile device to the destination in some embodiments.

The PCRF and the SDN controller can also communicate about some aspects of a particular application flow so that routing decisions both in the access network (between eNodeB and PGW) as well as in the backbone can be made based on the nature of the application and how that particular flow was expected to be treated based on operator policies and user subscription. For example, if a higher QoS is to be applied to a traffic flow carrying voice packet, the service related information such as QoS can be used by SDN controller to make decisions such as mapping and route optimizations. This can enable the entire network to be application aware with a consistent treatment of the packets.

Radio access network abstraction can provide a separation between the physical radios and a logical view of the network. It can provide a holistic view of a pool of various radio resources from various radio technologies. This can allow a network controller to make an intelligent decision on what radio to use to deliver a service based on application requirements. The radio access network abstraction can also have a dynamic learning capability to constantly update the network view of the radio resources upon adding, changing, removing and/or modifying the resources.

Under this framework, various applications (e.g., smart city, connected cars) and/or various customers (e.g., General Motors, Amazon, etc.) can ask for different services or technologies. Based on their service needs (e.g. latency, speed, etc.), the intelligent control can pick and choose access, backhaul, and/or service delivery based on this framework.

As shown in the figures, an abstraction layer can separate the physical radios and logical view of the radio network. The figures provide a holistic view of various radio resources from various radio technologies. In addition, the radio network graph can also have a presentation on network slices and their corresponding characteristics. The logical view and access can allow an SDN controller to make intelligent decisions based on the conditions, radio technology, and what slice to use to deliver a service based on application requirements.

Global positioning system (GPS) tagging the movement of an object and extrapolating its direction and speed can be used for various purposes (e.g., amber alert police location, vehicle tracking, etc.). It can account for feedback from responding users and the user's location at the time of reports to assist in determining and extrapolating the direction that a police car, or an amber alert vehicle, is moving.

The ability to geo tag a message while the sender reports an incident or a sighting can be further complicated when either the sender or the object is moving at a certain speed and direction. This can provide an extremely inaccurate picture/info of the location of the object, even if reports are being collected from multiple sources. For instance, if there is an amber alert active and every driver is reporting their sighting to a central database, the actual location and possible direction of an object can be far from what is being reported.

Next generation onboard augmented reality (AR)/virtual reality (VR) solutions can comprise fixed and variable information that can either be preloaded or can be offloaded from a network database (e.g., a fixed point of interest (POI) or building). However, to include entities with variable locations in the AR/VR environment, an onboarding unit (OBU) can collect information from sensory or other onboard devices such as: satellites, moving vehicles, drones, etc. To correctly identify and predict the location, current heading, and/or speed of the object, the sighting can be collected from a number of sources while the sources are stationary or moving. The information can be collected with an edge computing node to extrapolate the information in different categories, including but not limited to: type of the device reporting the sighting, whether the device is stationary, whether the device is moving (e.g., phone speed cameras, drones . . . ), and/or a combination with time of the report, etc. The information can be used to extrapolate the location of the object and also the direction and the speed of the object. The ability to calculate the information with edge computing nodes can also comprise an ability to add more enriched information by prediction of the object's whereabouts. Edge computing is a distributed computing paradigm in which computation is largely or completely performed on distributed device nodes known as smart devices or edge devices as opposed to primarily taking place in a centralized cloud environment.

The system can integrate with existing resources such as surveillance cameras and law enforcement drones to get a confirmation of the objects location. This solution can also be used by applications such as Google or Waze, which are used to alert drivers of an accident, police vehicles on the route some is traveling, etc. The crowd-sourced information can provide the edge computing node with the ability to extrapolate the exact location of the object and the direction and speed the object is headed. Thus, the application can keep a driver informed at any given time.

6G network slicing capabilities can enable the edge computing of the received GPS latitude and longitude, by either instantiating the dedicated slice or reusing the existing slice to enable allocation of details about the target moving object by accessing the information gathered via the GPS enabled participants. By utilizing a dedicated slice, existing resources such as traffic cameras, drones, and other available resources can be enabled to participate in necessary confirmation and contribute additional measurement data to more precisely locate the target. The network slice can be dedicated for a specific network function (e.g., extended reality, augmented reality, and/or virtual reality) to manage and allocate network resources. For example, currently when an application session begins, the session can either instantiate the slice or tap into a slice that is already there. So once a consumer begins consuming a service, the slice is already active for that service. Thus, the XR can have its own specific slice.

When the data is sent to a media access control layer (MAC), the MAC layer can send the data to an access layer via a service layer. A number of reports (to a MAC platform) can be used from a variety of devices (e.g., vehicle, drone, camera, etc.) to confirm a status associated with an object and/or an event. The reports from the variety of devices can increase the probability that the event has actually occurred. This data can be routed to a mobile computing center by utilizing high processing and storage capabilities. The data can be received and validated prior to being sent back to subscribers of the system. For example, the data (e.g., photographs, videos, etc.) can be geo-tagged with a location and a direction of which way an object is moving.

By extrapolating the data (e.g., photo, video, longitude, latitude, timestamp, intersection, etc.) provided from devices that observe the object, the data can be used to determine a specific way to highlight (e.g., different size, specific color, specific shape, etc.) an augmented and/or virtual reality representation of that object. Thus, the subscriber can see what the object is (e.g., what type of vehicle), how fast it is moving, which direction it is headed, etc. For example, while a user in a vehicle is observing an emergency services vehicle crossing an intersection, an AR view or icon of the emergency services vehicle can pop up on a heads-up display of the user's vehicle. Based on data curated by the system, the heads-up display can continue to show the AR view of the emergency services vehicle even if the user can no longer physically see the emergency services vehicle. The AR reality view can comprise an actual and/or predicted direction of the emergency services vehicle. Additionally, data generated by the user's vehicle, regarding the emergency services vehicle, can be sent to the system or directly to other vehicles in the vicinity to assist in the generating of AR/VR representations of the emergency services vehicle for other user vehicles.

The system can inform the user with an accurate depiction (e.g., AR, VR, video, picture(s), etc.) of an upcoming traffic status including whereabouts of police and emergency vehicles and the speed and direction they are heading. The system can also reduce false sighting, and enrich the information with by using data from other resources such as sped cameras and emergency drones.

In one embodiment, described herein is a method comprising generating, by a vehicle comprising a processor, first object data representative of a first location of an object sensed by the vehicle. In response to the generating, the method can comprise transmitting, by the vehicle, the first object data to a wireless network device to facilitate an augmented reality representation of the object. Additionally, in response to the transmitting, the method can comprise receiving, by the vehicle, second object data representative of a second location of the object from the wireless network device. Furthermore, based on the receiving the second object data, the method can comprise generating, by the vehicle, augmented reality data representative of the second location of the object.

According to another embodiment, a system can facilitate receiving, from mobile devices of a wireless network, description data associated with an object visible to the mobile devices. In response to the receiving the description data, the system can facilitate generating augmented reality data representative of the object. Furthermore, in response to the generating the augmented reality data, the system can facilitate sending the augmented reality data to a mobile device, of the mobile devices, to facilitate an augmented reality display representative of the object by the mobile device.

According to yet another embodiment, described herein is a machine-readable storage medium that can perform the operations comprising receiving, from wireless network devices of a wireless network, image data associated with an object visible to the wireless network devices. Based on a condition associated with a number of the wireless network devices being determined to have been satisfied, the machine-readable storage medium can perform the operations comprising determining an accuracy of the image data. Additionally, in response to the determining the accuracy of the image data, the machine-readable storage medium can perform the operations comprising facilitating displaying a virtual reality representation of the object via a wireless network device of the wireless network devices.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 6G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Figure 2:
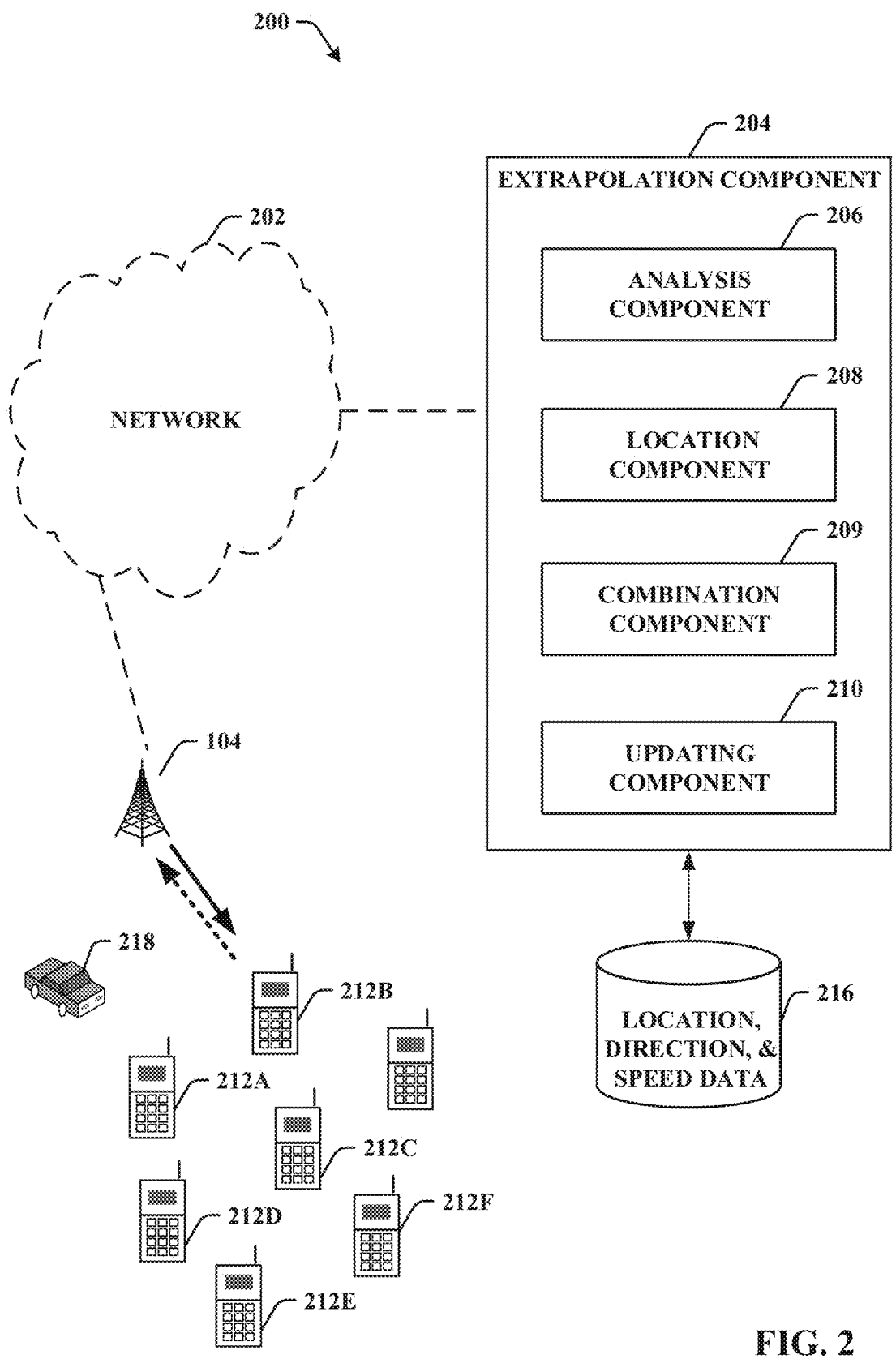
FIG. 2 illustrates an example schematic system block diagram of a mobile network architecture according to one or more embodiments.

Referring now to FIG. 2, illustrated is an example schematic system block diagram of a mobile network architecture according to one or more embodiments. FIG. 2 depicts a system 200 for augmented reality using crowd sourced propagation media and location data in accordance with various aspects described in this disclosure. The system 200 can comprise a network 202 (e.g., system 100) and an extrapolation component 204. The extrapolation component 204 can determine a location of a vehicle 218 via a UE location component 208. Crowd sourced data, from mobile devices 212A, 212B, 212C, 212D, 212E, 212F can comprise location data of the mobile devices 212A, 212B, 212C, 212D, 212E, 212F and media (e.g., pictures, video, sounds, etc.) associated therewith. Additionally, the crowd-sourced data can be sent directly to the extrapolation component 204 or sent to the network 202 (via the network node 104) to be forwarded to the extrapolation component 204.

The extrapolation component 204 can also comprise an analysis component 206 that can analyze the crowd-sourced data to determine viability and relevancy to an augmented reality display generated based on the crowd sourced data. For example, if the analysis component 206 determines that some media is redundant, it can delete additional copies of the redundant media to generate efficiencies. In other cases the analysis component 206 can determine that not enough crowd-sourced media has been received and can prompt the mobile devices 212A, 212B, 212C, 212D, 212E, 212F to submit such media. The updating component 210 can then send the combined data back to the network 202 and/or the vehicle 218 to facilitate generating an augmented reality display representative of the extrapolated data for the vehicle 218 or for other vehicles.

The analysis component 206 can calculate, identify, or otherwise determine a media and location accuracy. For example, in one implementation, the analysis component 206 can determine if certain media overlaps (e.g., the same or similar pictures with the same or similar location tag). If the media does overlap, then the analysis component 206 can generate probability data representative of a greater probability that the media is accurate. This probability data can then be used to generate an augmented reality representation.

The location component 208 can acquire, determine, or otherwise receive a location, speed, time, and/or direction of the mobile devices 212A, 212B, 212C, 212D, 212E, 212F, and/or an object the mobile devices have perceived. For example, a set of location based services (LBS) can be employed to determine the mobile devices 212A, 212B, 212C, 212D, 212E, 212F location. The set of LBS can include but are not limited to global positioning systems (GPS), and/or assisted global positing systems (AGPS). For instance, the network 202 can request the mobile devices 212A, 212B, 212C, 212D, 212E, 212F to employ an AGPS associated with the mobile device 212A to determine a location of the mobile device 212A or the object (e.g., vehicle 218) it is generating media for or has generated media for. In response to the request, the mobile device 212A can provide a set of AGPS measurements, and the location component 208 can receive the set of AGPS measurements, e.g., via the network 202. The AGPS measurements can provide a fixed reference point (e.g., latitude and longitude) that can be used to facilitate a determination of a location of an access point of the mobile device 212A or the vehicle 218.

The combination component 209 combines, joins, or otherwise includes the mobile device location in a set of location data. In addition, the combination component 209 can append, attach, or otherwise associate a time stamp and/or mobile device identifier to the set of location data. For example, media from the mobile device 212A and the location received at a first time (e.g., 6:00 AM on Apr. 4, 2019) can be included in a first set of location data, and a time stamp corresponding to the first time and/or an identifier of the mobile device 212A can be associated with the first set of location data.

The combination component 210 can combine and/or prioritize the crowd-sourced data received from the mobile devices 212A, 212B, 212C, 212D, 212E, 212F. For example, multiple pictures of a vehicle 218 (e.g., an object) can be combined via the combination component 209. It should be noted that the mobile devices 212A, 212B, 212C, 212D, 212E, 212F can be vehicles, cellular phones, tablets, etc. It should also be noted that location data of the mobile devices 212A, 212B, 212C, 212D, 212E, 212F can be stored at the location database 216. For example, in some instances, stationary video cameras can provide their location to the extrapolation component 204 so that media generated by the stationary cameras can also be considered for updating an augmented reality display. Thus media from the mobile devices 212A, 212B, 212C, 212D, 212E, 212F and stationary devices can be used to increase the accuracy of the system. It should also be noted that the location database 216 can be internal or external to the extrapolation component 204. It can be appreciated that although the sets of location data are illustrated as being maintained in a data store 216, such implementation is not so limited. For example, the sets of location data can be maintained in a different location, and the network node 104 can access the sets of location data via a network connection.

Figure 3:
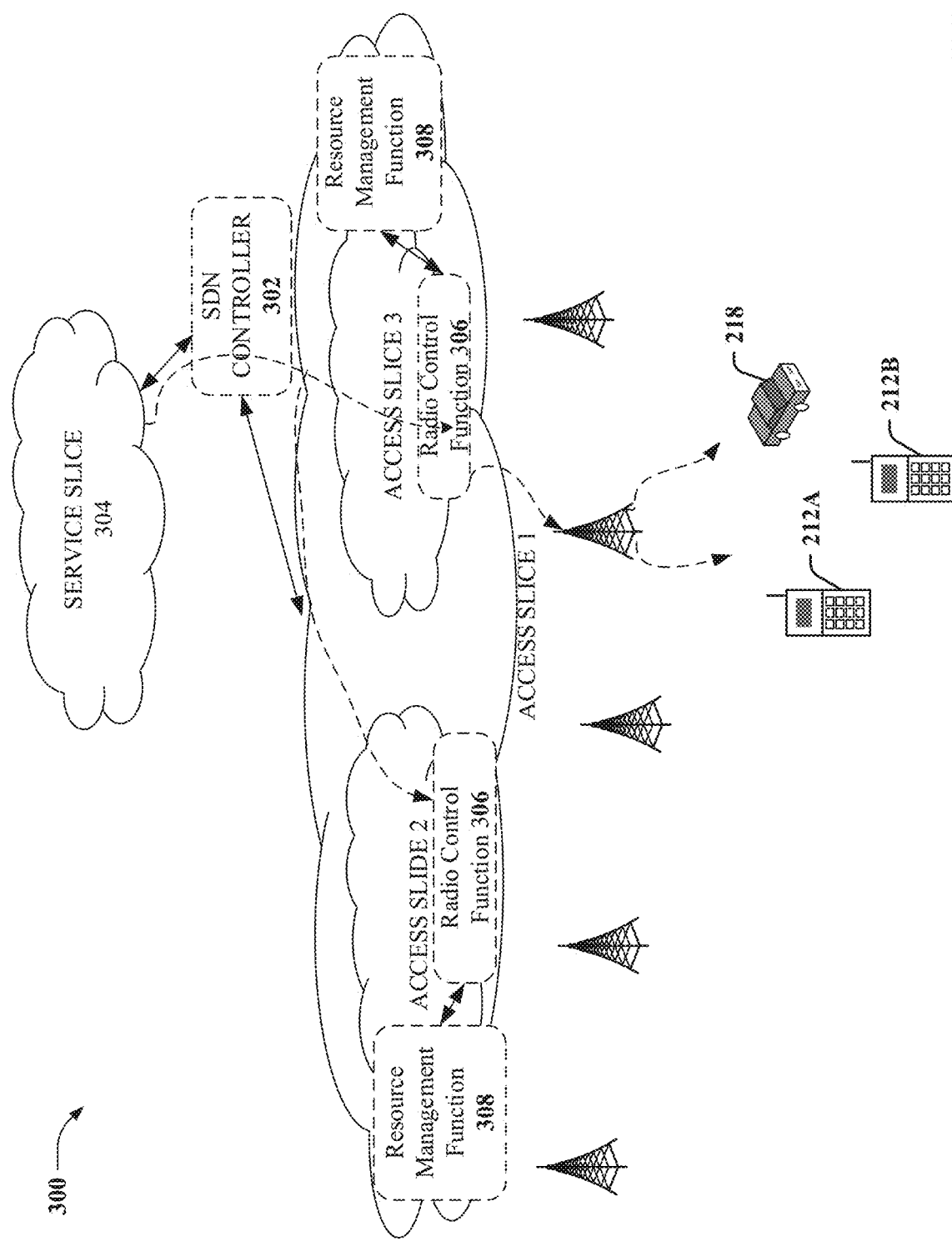
FIG. 3 illustrates an example schematic system block diagram of network slicing according to one or more embodiments.

Referring now to FIG. 3, illustrated is an example schematic system block 300 diagram of network slicing according to one or more embodiments.

An abstraction layer can separate the physical radios and logical view of the radio network. Thus various radio resources from various radio technologies can be utilized. The logical view and access can allow an SDN controller to make intelligent decisions based on the conditions, radio technology, and what slice to use to deliver a service based on application requirements. Additional access technology/resources, such as macro access technology (e.g., eNode B) and micro access technologies (e.g., Wi-Fi, wireless local area network (WLAN), low-power wide area network (LPWAN), long range (LoRa), radio access network (RAN)s, Bluetooth peer-to-peer network, metro cell, etc.), can be added to address access uniformity issues.

Network slices 304 can be created to address specific needs of service calls, or transport, or access capability. Thus, the access network can be divided by slices to separately address multiple needs. The slice of an access layer can be vertical or horizontal and can manage a defined number of radios with various frequencies and various capabilities. For example, an access slice can comprise a resource management function 308, a radio control function 306, and other capabilities to aid a specific function. The resource management function 308 can determine, for the radio controller function 306, how many resources it needs, which can depend on what type of service it is using. The service can communicate to the access layer what kind of bandwidth it is looking for, which can be controlled by the SDN controller 302.

6G network slicing capabilities can enable edge computing of the received GPS latitude and longitude, by either instantiating a dedicated slice or reusing an existing slice to enable allocation of details about the moving object (e.g., vehicle 218) by accessing the information gathered via the GPS enabled participants. By utilizing a dedicated slice, existing resources such as traffic cameras, drones, and other available resources can be enabled to participate in confirmation and contribute additional measurement data to more precisely locate the moving object. The network slice can be dedicated for a specific network function (e.g., extended reality, augmented reality, and/or virtual reality) to manage and allocate network resources.

The resource management function 308, on a slice, can access information on the resources of a particular slice and decide where it has additional and/or unused resources (e.g., Wi-Fi, LPWAN, access capability) that it can add to the service application. Alternatively, the resource management function 308 can remove capacity from other service applications that are of a lessor priority and/or that do not need as much capacity. Consequently, the resource management function 308 can distribute and/or allocate a specific resource and/or percentage of resources based on policies (e.g., policies associated with eNode B devices, service level agreements, priorities, network loads, etc.).

Figure 4:
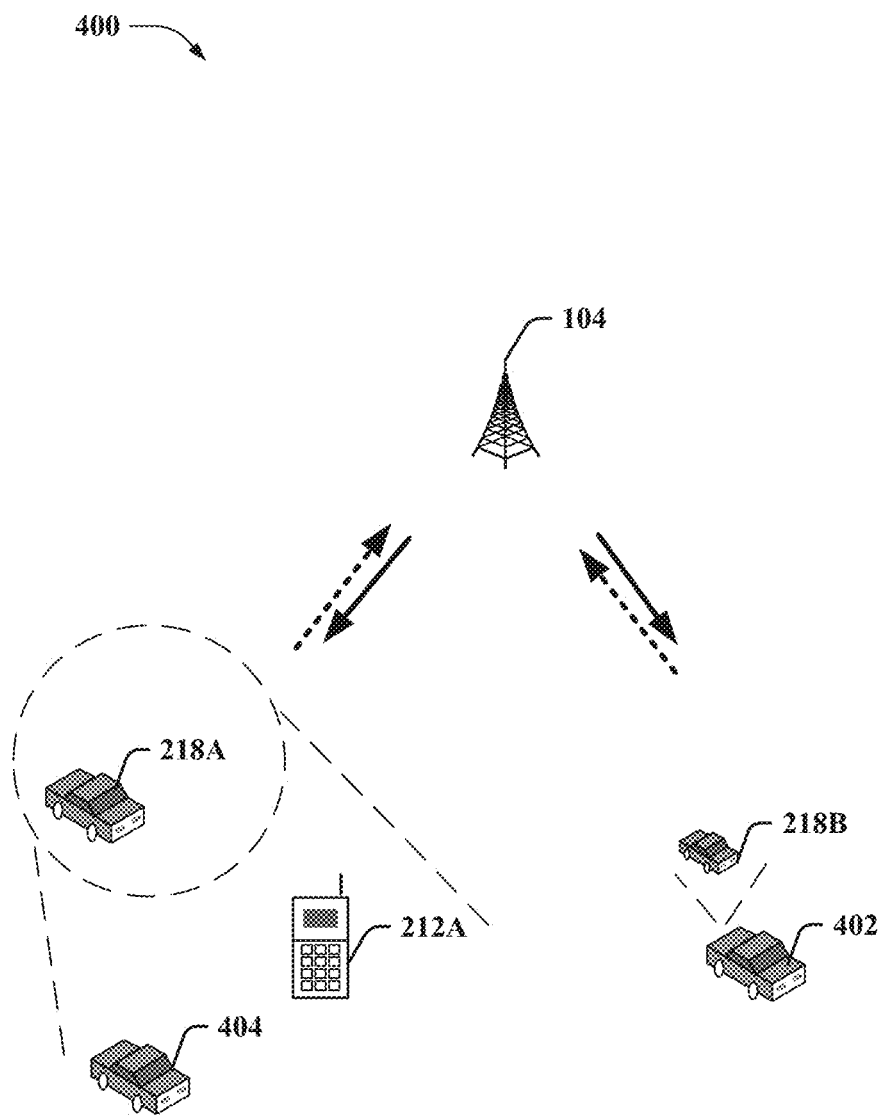
FIG. 4 illustrates an example system for communication to facilitate augmented reality according to one or more embodiments.

Referring now to FIG. 4, illustrated is an example system 400 for communication to facilitate augmented reality according to one or more embodiments. In one embodiment, as depicted by FIG. 4, a vehicle 218A can be seen by the mobile device 212A and another vehicle 404. The mobile device 212A and the other vehicle 404 can then send media data to the network node 104. The media data can comprise time, location, direction, and/or speed of the vehicle 218A. As mentioned above, the extrapolation component 204 can then process and store this data so that it can be transmitted to yet another vehicle 402 as an augmented reality representation 218B of the vehicle 404. Consequently, the vehicle 404 can display the augmented reality representation 218B. The display can continually be updated by the extrapolation component 204 as the extrapolation component 204 receives additional data from other vehicles, mobile devices, and/or stationary devices capable of generating media. The augmented reality service can be provided by a specific network slice for augmented reality services. It should also be noted that the vehicle 404 can utilize data received from the network node 104 to generate its own augmented reality representation 218B.

Figure 5:
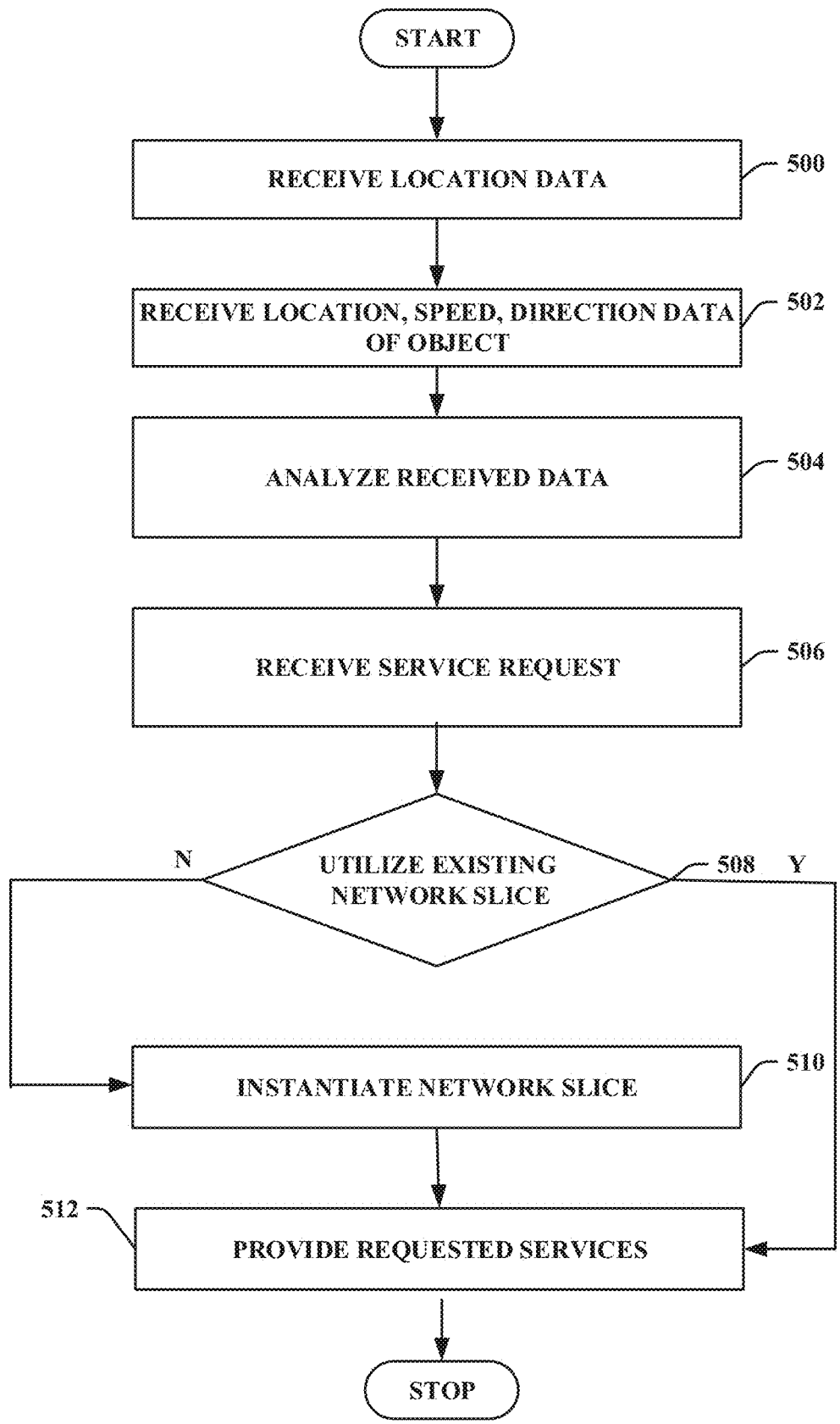
FIG. 5 illustrates an example flow diagram to facilitate augmented reality according to one or more embodiments.

Referring now to FIG. 5, illustrated is an example flow diagram to facilitate augmented reality according to one or more embodiments. At block 500, the location component 208 of the extrapolation component 204 can receive location data associated with a location of mobile devices 212 and/or stationary devices. The extrapolation component 204 can also received location, speed, and/or direction data related to an object (e.g., vehicle 218A) to be represented via the augmented reality representation 218B. The analysis component 206 can analyze both sets of received data to determine a validity of the data. For example, the more data received from various mobile devices 212 and/or stationary devices, the higher probability that the data is accurate. The combination component 209 can then combine the received data to facilitate the augmented reality representation 218B. The updating component 210 can then provide this data to a requesting vehicle 402 based upon a received service request at block 506. The system can then determine if a network slice has previously been used for the augmented reality service at block 508. If the augmented reality service has already be provided to the vehicle 402, then an existing network slice can be used to provide the augmented reality services at block 512. However, if the network slice has not previously provided the augmented reality service, then a network slice can be instantiated at block 510 to provide the augmented reality service.

Figure 6:
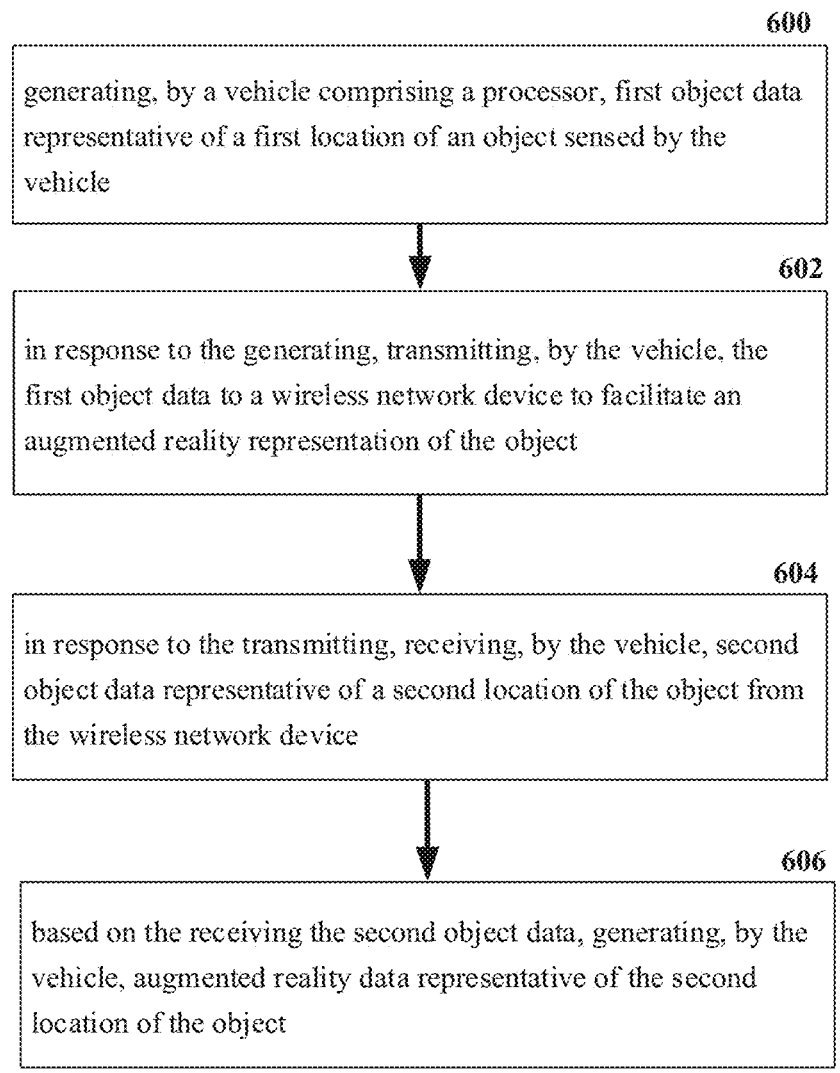
FIG. 6 illustrates an example flow diagram of a method for facilitating augmented reality according to one or more embodiments.

Referring now to FIG. 6, illustrated is an example flow diagram of a method for facilitating augmented reality according to one or more embodiments. At element 600, a method can comprise generating (e.g., via the vehicle 404) first object data representative of a first location of an object sensed by a vehicle. In response to the generating, the method can comprise transmitting (e.g., via the vehicle 404) the first object data to a wireless network device to facilitate an augmented reality representation of the object at element 602. Additionally, in response to the transmitting, the method can comprise receiving (e.g., via the vehicle 404) second object data representative of a second location of the object from the wireless network device at element 604. Furthermore, at element 606, based on the receiving the second object data, the method can comprise generating (e.g., via the vehicle 404) augmented reality data representative of the second location of the object.

Figure 7:
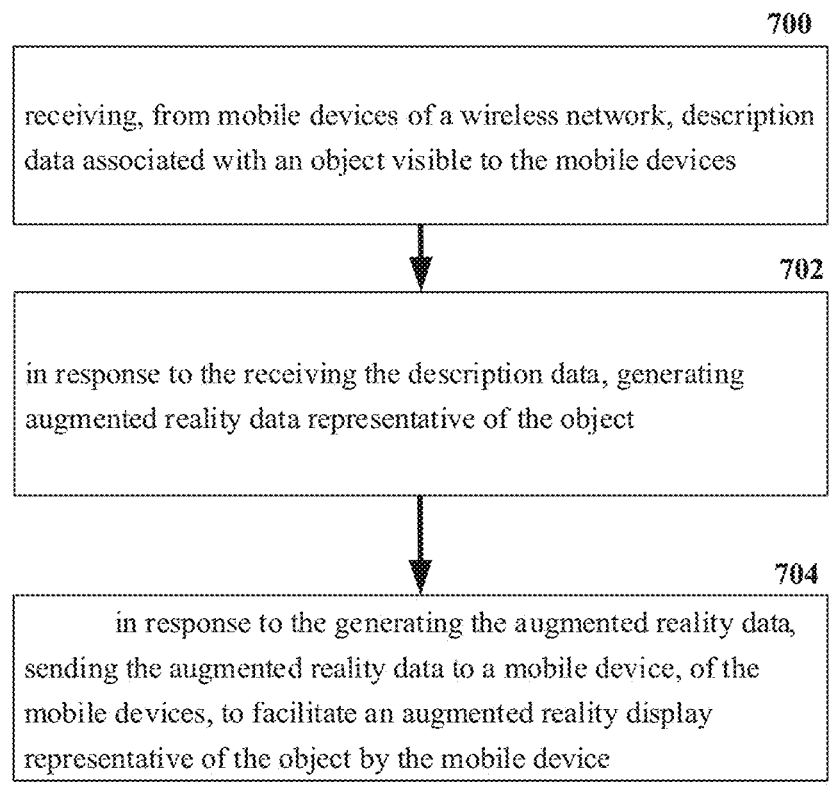
FIG. 7 illustrates an example flow diagram of a system for facilitating augmented reality according to one or more embodiments.

Referring now to FIG. 7, illustrated is an example flow diagram of a system for facilitating augmented reality according to one or more embodiments. At element 700, a system can facilitate receiving (e.g., via the extrapolation component 204), from mobile devices 212A, 212B, 212C of a wireless network, description data associated with an object visible to the mobile devices. In response to the receiving the description data, the system can facilitate generating augmented reality data (e.g., via the extrapolation component 204) representative of the object at element 702. Furthermore, in response to the generating the augmented reality data, at element 704, the system can facilitate sending (e.g., via the extrapolation component 204) the augmented reality data to a mobile device 212A, of the mobile devices 212A, 212B, 212C to facilitate an augmented reality display representative of the object by the mobile device 212A.

Figure 8:
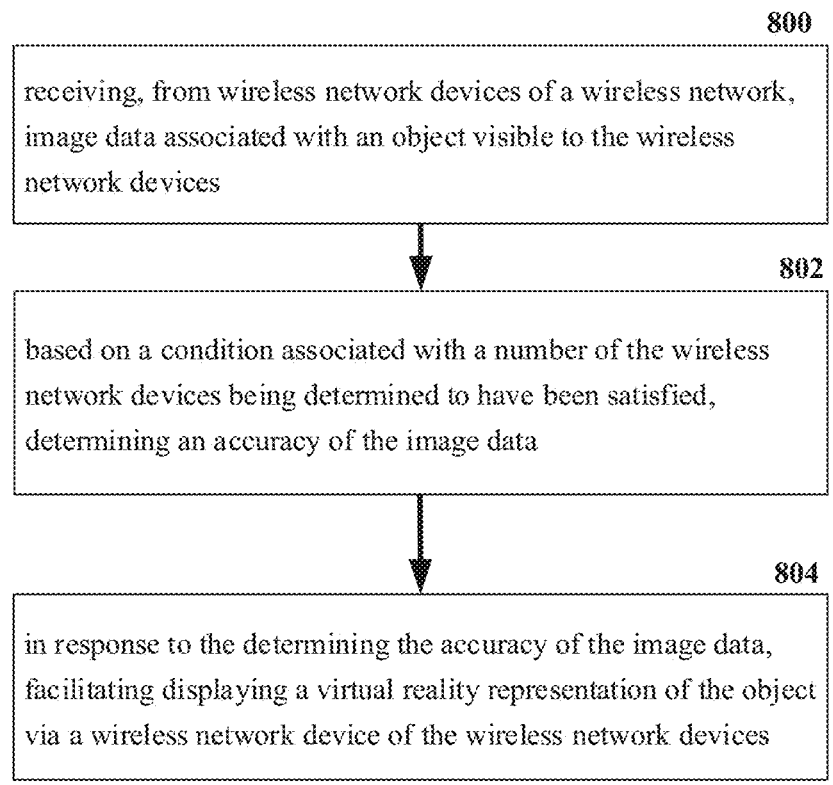
FIG. 8 illustrates an example flow diagram of a machine-readable medium for facilitating augmented reality according to one or more embodiments.

Referring now to FIG. 8, illustrated is an example flow diagram of a machine-readable medium for facilitating augmented reality according to one or more embodiments. At element 800, a machine-readable storage medium can perform the operations comprising receiving (e.g., via the extrapolation component 204), from wireless network devices of a wireless network, image data associated with an object visible to the wireless network devices. Based on a condition associated with a number of the wireless network devices being determined to have been satisfied, the machine-readable storage medium can perform the operations comprising determining (e.g., via the analysis 206 component 204) an accuracy of the image data at element 802. Additionally, in response to the determining the accuracy of the image data, the machine-readable storage medium can perform the operations comprising facilitating displaying (e.g., via the updating component 210) a virtual reality representation of the object via a wireless network device (e.g., the mobile device 212A) of the wireless network devices at element 804.

Figure 9:
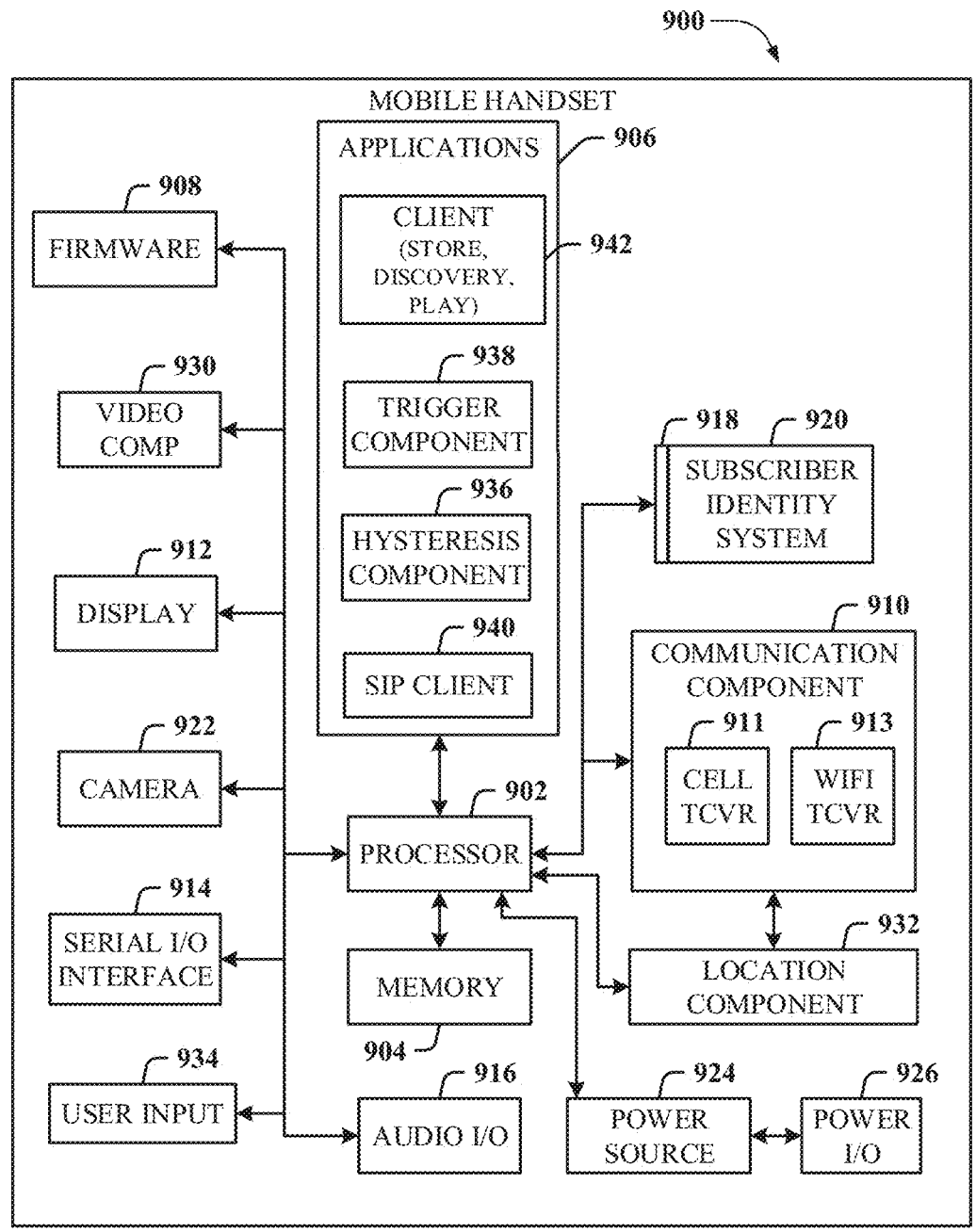
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that this disclosure also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
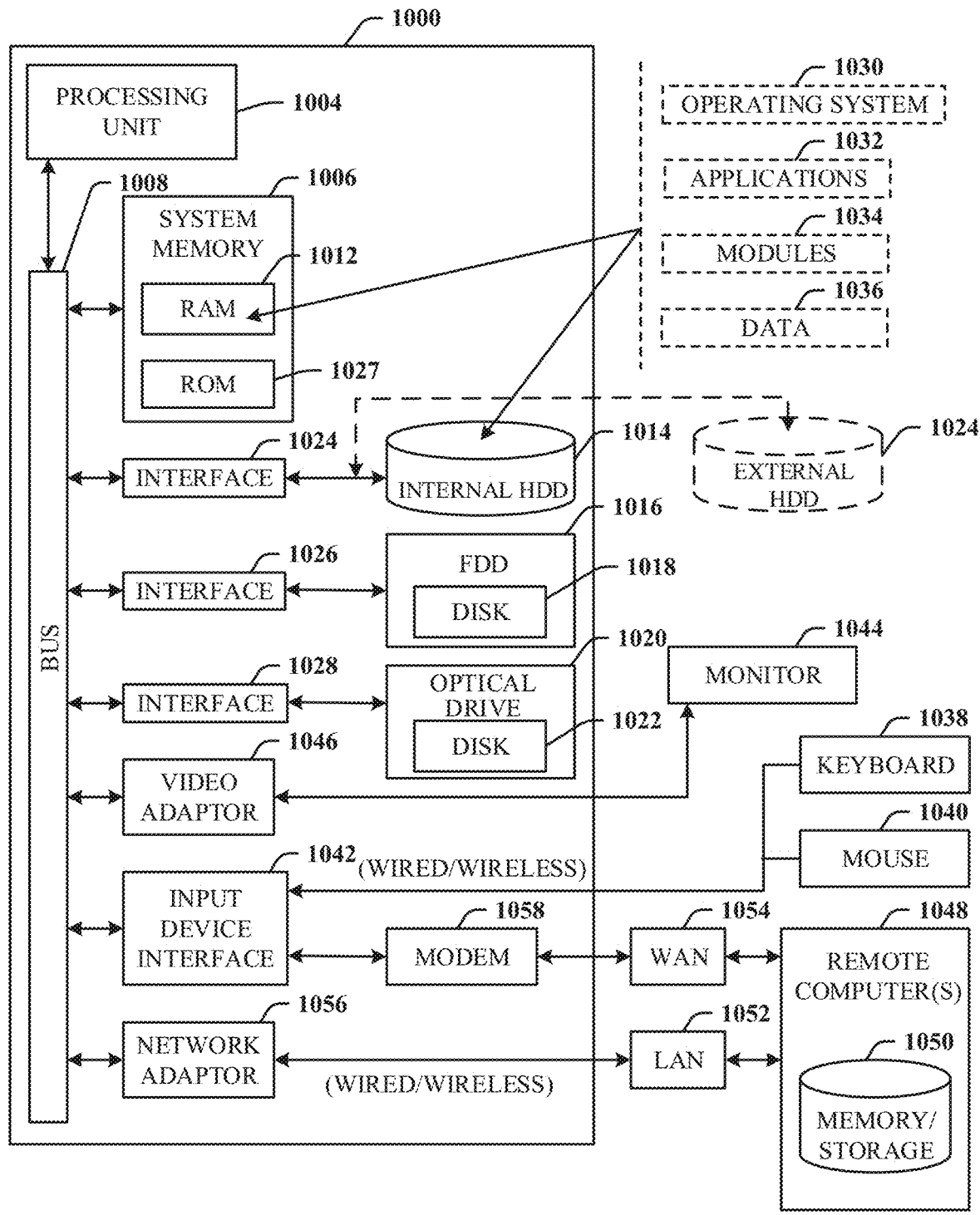
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of this disclosure can be implemented to facilitate the establishment of a transaction between an entity and a third party. While the description above is in the general context of computer-executable instructions that can run on one or more computers, those skilled in the art will recognize that this disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of this disclosure can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosure.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that this disclosure can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by a vehicle comprising a processor, first object data representative of a first location of an object sensed by the vehicle;
in response to generating the first object data, transmitting, by the vehicle, the first object data to network equipment to facilitate an augmented reality representation of the object;
in response to transmitting the first object data, receiving, by the vehicle, second object data representative of a second location of the object from the network equipment;
in response to receiving the second object data, determining, by the vehicle, that a threshold amount of media has not been satisfied, wherein the media comprises a sound file;
in response to determining that the threshold amount of the media has not been satisfied, prompting, by the vehicle, a user equipment to transmit the media; and
based on receiving the second object data, generating, by the vehicle, augmented reality data representative of the second location of the object.

2. The method of claim 1, further comprising:
in response to generating the augmented reality data, displaying, by the vehicle, an icon representative of the vehicle.

3. The method of claim 1, further comprising:
determining, by the vehicle, that the second object data has been previously received by the vehicle.

4. The method of claim 1, wherein the augmented reality data is first augmented reality data, and wherein generating the first augmented reality data comprises generating second augmented reality data representative of the first location of the object.

5. The method of claim 1, wherein generating the augmented reality data is a function of a characteristic of a network slice dedicated to an augmented reality function.

6. The method of claim 1, wherein generating the augmented reality data comprises applying a defined color to the augmented reality representation of the object.

7. The method of claim 1, wherein the vehicle is a first vehicle, and further comprising:
sending, by the first vehicle, the augmented reality data to a second vehicle.

8. A system, comprising:
a processor; and
a memory that stores executable instructions that, when executed by the processor, facilitate performance of operations, comprising:
based on first description data associated with an object visible to a user equipment, generating augmented reality data representative of the object;
in response to generating the augmented reality data, sending the augmented reality data to the user equipment, to facilitate an augmented reality display representative of the object by the user equipment;
in response to sending the augmented reality data, receiving, from the user equipment, second description data representative of a location of the object in relation to the user equipment;
in response to receiving the second description data, determining that the second description data is identical to the first description data;
receiving media data representative of media comprising a sound file;
in response to receiving the media data, determining that a threshold amount of the media has not been satisfied; and
in response to determining that the threshold amount of the media has not been satisfied, prompting the user equipment to transmit the media.

9. The system of claim 8, wherein the first description data comprises a location associated with the object.

10. The system of claim 8, wherein generating the augmented reality data to the user equipment is based on a location of the user equipment.

11. The system of claim 8, wherein the operations further comprise:
based on a type of the object visible to the user equipment, modifying the augmented reality display.

12. The system of claim 8, wherein the operations further comprise:
modifying a color of the augmented reality display.

13. The system of claim 8, wherein the first description data comprises geo-tag data representative of a geographic location of the object.

14. The system of claim 8, wherein the operations further comprise:
receiving, from the user equipment via a network, the first description data associated with the object visible to the user equipment.

15. A non-transitory machine-readable medium, comprising executable instructions that, when executed by a processor, facilitate performance of operations, comprising:
based on a condition associated with network equipment being determined to have been satisfied, determining an accuracy of image data associated with an object visible to the network equipment; and
in response to determining the accuracy of the image data, displaying a virtual reality representation of the object via equipment of the network equipment;
in response to the displaying, receiving, from the network equipment, description data representative of a location of the object in relation to the network equipment;
in response to receiving the description data, determining that the description data is a same as previously received description data;
receiving sound file data representative of a sound file;
based on the sound file data, determining that a threshold amount of the sound file has not been satisfied; and
in response to determining that the threshold amount of the sound file has not been satisfied, prompting the equipment to transmit the sound file.

16. The non-transitory machine-readable medium of claim 15, wherein the operations further comprise:
allocating a network slice of a network to a virtual reality function to be utilized by the network equipment.

17. The non-transitory machine-readable medium of claim 15, wherein the operations further comprise:
based on determining that the description data is the same as the previously received description data, deleting the description data to increase a defined processing efficiency from a first efficiency to a second efficiency greater than the first efficiency.

18. The non-transitory machine-readable medium of claim 15, wherein the image data comprises timestamp data representative of a time associated with when the object was visible to the equipment.

19. The non-transitory machine-readable medium of claim 15, wherein the operations further comprise:
   generating prediction data representative of a prediction of a direction in which the object is predicted to travel.

20. The non-transitory machine-readable medium of claim 15, wherein the equipment of the network equipment is first network equipment, and wherein the displaying of the virtual reality representation comprises displaying the virtual reality representation via second network equipment that is not part of the first network equipment.

* * * * *